March 15, 1960 H. J. BALHOUSE 2,928,416
SWING CHECK VALVE
Filed May 29, 1957 2 Sheets-Sheet 1

INVENTOR.
Harold J. Balhouse.
BY
HIS ATTORNEY.

INVENTOR.
Harold J. Balhouse.
BY
HIS ATTORNEY.

United States Patent Office 2,928,416
Patented Mar. 15, 1960

2,928,416

SWING CHECK VALVE

Harold J. Balhouse, Stamford, Conn., assignor to Walworth Company, New York, N.Y., a corporation of Massachusetts Application May 29, 1957, Serial No. 662,529

8 Claims. (Cl. 137—527.8)

This invention relates to valves and more particularly to check valves of the swing type.

Swing check valves may be arranged to provide for unobstructed flow of fluid in the full-open valve position and thus minimize pressure drop in the pipeline system. The present invention also seeks to provide minimum impedance to fluid flow by arranging a less than full-open position for the valve member under certain conditions of fluid circulation in the system. Prior valves have relied upon reverse seat angles or so-called balanced disc arrangements to achieve the desired results and in some cases, the valve discs have been counterbalanced by added metal weights. Such expedients tend to produce excessively high pressure drop, sluggish action and hydraulic shock pressure due to requirements of design. In some instances, particularly in the balanced disc type, the disc members of these prior valves are located within the flow passage when full open, and are subject to destructive flutter at high rates of flow.

An object of this invention is to balance a swing check valve disc to conform to a predetermined angular position under predetermined flow conditions.

Another object of the invention is to minimize flow impedance under low flow rates in the system.

Another object of the invention is to eliminate flutter of the valve disc at high rates of flow.

Another object of the invention is to utilize maximum gravity forces in the full-open position of the disc for rapid closing under reverse flow conditions.

These and other objects and advantages are obtained in a preferred embodiment of a swing check valve structure having a body provided with a flow passage and a valve chamber positioned laterally thereof. An annular valve seat is positioned transversely of the flow passage for cooperation with a valve disc movable between full-closed and full-open positions relative to the valve seat and the chamber. The valve disc is pivoted on an arm member which is itself pivoted on a support in the valve chamber. The arm member is provided with suitable stops which limit the angular position of the valve disc relative to the valve seat in the partially open position and limit the position of the arm and valve disc relative to the flow passage in the full-open and closed positions.

Figure 1:
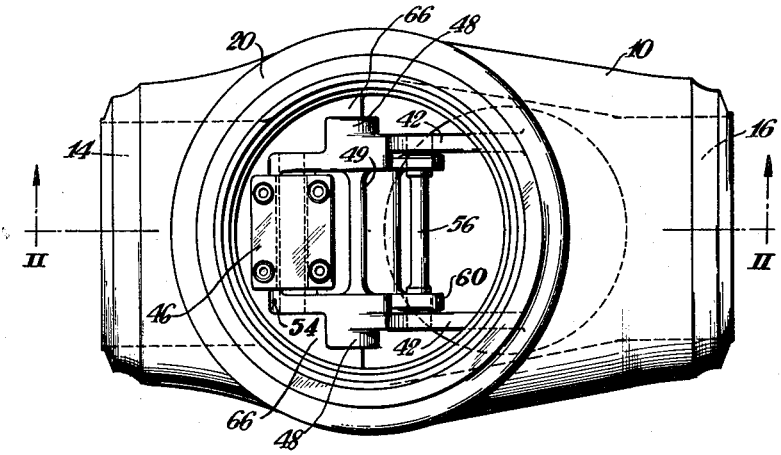
Fig. 1 is a plan view of the valve with the closure removed to show the internal construction.

Referring now more particularly to the drawings, the valve body 10 is provided with a flow passage 12 extending therethrough from an inlet 14 to an outlet 16. The inlet 14 and outlet 16 are adapted for connection in a pipeline and, to this end, are provided with conventional welding connections 18. It will be understood, however, that other conventional means of connection may be employed such as threading or flanging the inlet 14 and outlet 16 ends.

The body 10 is provided with a bonnet portion 20 into which extends a valve chamber 22 internally threaded for the reception of a closure cap 24. A hemispherical sealing ring 26 is welded to the body 10 and the closure cap 24 across the threaded connection therebetween to prevent leakage. An eyebolt 28 secured to the closure cap 24 forms a convenient means for transporting the valve between locations.

The flow passage 12 is interrupted by an enlarged dome-shaped portion 30 which defines an annular shoulder 32 in the flow passage 12. The shoulder 32 accommodates a valve seat 34 which, in this instance, comprises an inserted ring having a conical seating surface 36. A disc valve member 38 having a beveled edge 40 for seating engagement with the conical surface 36 is adapted to be moved between full-closed position relative to the seat 34, as shown in full lines on Fig. 2, and full-open position within the chamber 22, as shown in broken lines on Fig. 2.

Preferably the valve disc 38 is of airfoil or hydrofoil design with contours chosen for optimum performance under the service conditions of line fluid and flow velocity in the system. The valve disc 38 is so balanced as to rest at a predetermined angle relative to the valve seat 34 under predetermined flow conditions in the flow passage 12. Thus, under a condition of zero flow in the flow passage 12, the valve disc 38 is positioned at an acute angle relative to the valve seat 34, such angular position of the valve disc 38 being illustrated by the broken line position in Fig. 2 having the angle $a$ as shown. It will be understood that the angle $a$ is chosen to achieve a predetermined open area available for flow under thermal circulation conditions which may be required for emergency cooling or other purposes in the pipeline system. In choosing angle $a$, consideration is given to the angular positions under which the valve may be required to operate, as in the case of list, roll, and turn conditions in shipboard service.

The angular relation of the valve disc 38 relative to the valve seat 34 is obtained by a pivotal connection for the valve disc 38 which includes a connecting means in the form of a pair of lugs 42 projecting at an acute angle from the rear surface of the valve disc 38 opposite the beveled portion 40. The lugs 42 each terminate in a substantially flat end face 44 extending substantially perpendicular to the plane of the valve disc 38 for a purpose which will be apparent hereinafter.

Support means for the valve disc 38 takes the form of a bearing block 46 and an arm member 48 mounted thereon. The bearing block 46 is secured at one end of the valve chamber 22 on a suitable platform 50 extending adjacent the annular shoulder 32. A bearing pin 52 extends transversely of the bearing block 46 and is journalled therein in a pair of bushings 55.

The bearing pin 52 projects from either end of the bearing block 46 and serves as a pivot for the arm member 48. The arm member 48 comprises a bifurcated element having its arms straddling the bearing block 46 and connected by a web portion 49 intermediate the pivoted and free ends. The free ends of the arm member 48 are adapted to extend into the flow passage 12 adjacent the valve member 38. The ends of the bearing pin 52 may be secured to the arm 48 by a lock pin 54.

The free ends of the arm member 48 carry a bearing pin 56 extending transversely therethrough and substantially parallel to the bearing pin 52. The bearing pin 56 is journalled in suitable mating holes in the free ends of the arm member 48 and projects therefrom to provide mounting means for the lugs 42 of the valve member 38. Since the projecting ends of the bearing pin 56 are journaled in the bushings 58 carried by the lugs 42, suitable securing means may be employed to prevent relative rotation between the bearing pin 56 and the free ends of the arm 48. Such means may take the form of a lock pin 60 which extends transversely through one free end of the arm member 48 and the bearing pin 56.

Movement of the valve member 38 to its full-open position within the chamber 22 is limited by engagement of a stop comprised of a surface 62 formed thereon intermediate the ends of the arm 48 with the underside of the closure member 24. Such full-open position is shown in broken lines in Fig. 2, whereas it will be observed that the valve member 38 is completely withdrawn from the flow passage 12 and occupies a position substantially parallel with the axis of the flow passage 12.

A second stop means is operable between the support means, comprising the arm member 48, and the valve member 38 for limiting pivotal movement of the valve member 38 intermediate the full-closed and full-open positions. As previously mentioned, the end surface 44 of the connection 42 extends substantially perpendicular to the plane of the valve member 38. Extending at an acute angle with the surface 44 when the valve member 38 is full closed is a projection 64 formed on each of the arms of the arm member 48. Under conditions of zero flow in the flow passage 12, the surfaces 44 and 64 may be in engagement with each other to establish the acute angle $a$ as previously described. The angle $a$ is determined by the desired flow resistance, and may be designed to be as little as 5° or less in a particular application, or may be as much as 40° or more for another application. It will be apparent that such angle depends upon the relative positions of the center of gravity of the disc and the bearing pin 56, the angular position of the arm member 48 under zero flow conditions, and the angular position of the valve in space at any given time.

Clockwise movement of arm member 48 beyond its position under zero flow conditions is prevented by the engagement of the arms with a pair of projections 66 extending from the annular shoulder 32. This stop establishes the extreme lower position of the arm member 48. In this position, the disc member 38 is free to rotate about pivot 56, relative to arm member 48, between its full closed position, as shown in full lines in Fig. 2, and its angle $a$ position, as shown in broken lines in Fig. 2.

In addition to the stop surfaces described above, there is a fourth set of stop surfaces comprised of surfaces 68 loacted on the arm member 48 immediately below surfaces 64. Surfaces 68 engage surfaces 44 on connecting member 42, thus preventing the valve disc 38 from swinging into a position relative to arm member 48 beyond that relative position which it will occupy when fully closed.

The operation of the swing check valve will be apparent from the foregoing description. Suffice it to say that fluid flow in the direction of the arrow in Fig. 2 will create a velocity pressure on the valve member 38 causing it to swing to the full-open position within the chamber 22. Should the direction of fluid flow be reversed from that indicated by the arrow, then the valve disc 38 and arm 48 swing downward until the arm 48 contacts the projections 66 and the valve member 38 becomes properly seated on the valve seat 34. It will be observed that near the full open position, gravity forces tending to close the valve are at a maximum and the closing action should be rapid.

Figure 2:
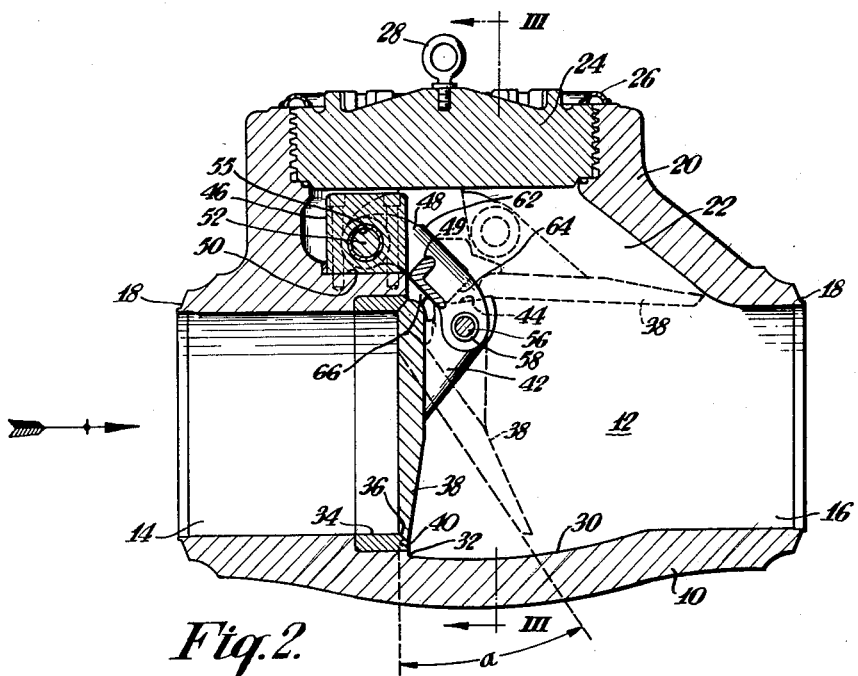
Fig. 2 is a section taken on the line II—II of Fig. 1 with the closure in place.
Figure 3:
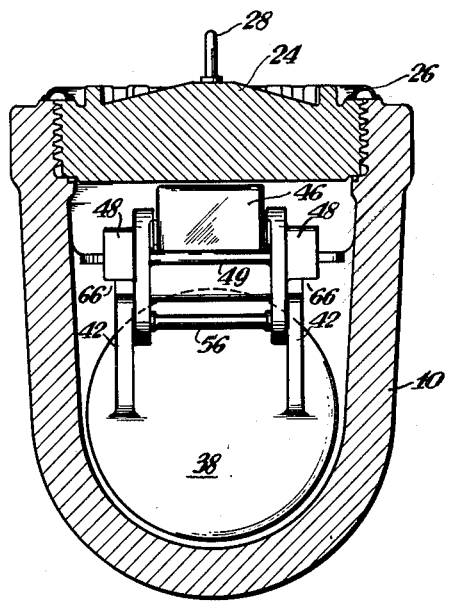
Fig. 3 is a cross-section taken on the line III—III of Fig. 2.
Figure 4:
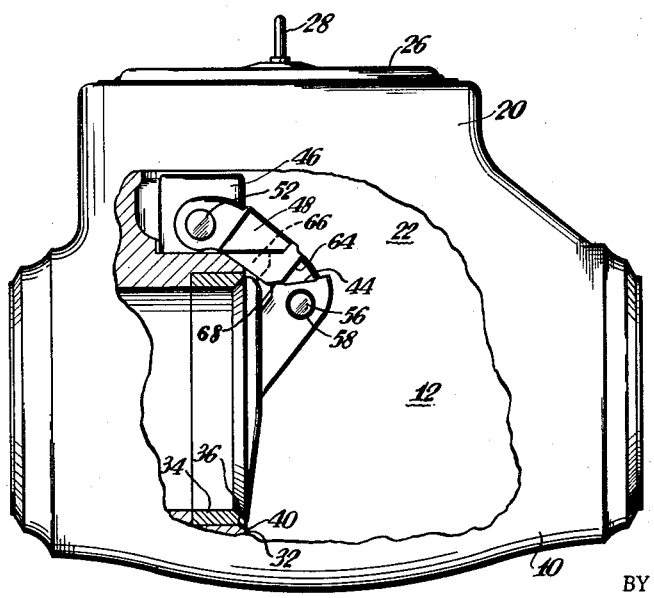
Fig. 4 is a front elevation with a portion of the body broken away to show the internal construction.

Under a condition of zero flow in the flow passage 12, the valve disc 38 will occupy the intermediate position shown in broken lines in Fig. 2 forming an acute angle $a$ with the valve seat 34 as previously explained. Under these conditions, minimum impedance to natural thermal convection circulation for emergency cooling or other purposes is provided.

It will be understood that various modifications may be made in the details of construction and arrangement of parts without departing from the scope of this invention as set forth in the appended claims.

I claim:

1. A valve comprising a body member having a flow passage therethrough, an annular valve seat in said passage, support means pivotally mounted with respect to said body member, a valve member pivotally mounted on said support means and movable between a full closed position in which it engages said valve seat and a full open position in which it is above and substantially parallel to said passage, said valve member being movable in response to flow conditions in said flow passage, means operable between said support member and said body member for limiting the movement of said support member in a closing direction, and stop means operable between said support means and said valve member, when said support member is limited in movement in a closing direction, for limiting the pivotal movement of said valve member relative to said support means in an opening direction at a point intermediate said full closed and full open position under predetermined flow conditions in said passage, said valve being characterized by a compound movement of said valve member and said support means about the pivotal connection between said support means and said body member when said predetermined flow conditions are exceeded.

2. A valve comprising a body member having a flow passage therethrough, an annular valve seat in said passage, support means pivotally mounted on said body above said flow passage, a valve member movable between a full closed position in which it engages said valve seat and a full open position in which it is above and substantially parallel to said passage, said valve member being movable in response to flow conditions in said flow passage, means carried by said valve member pivotally connected to said support means, means operable between said support member and said body for limiting the movement of said support member in a closing direction, and stop means operable between said support means and said means carried by said valve member, when said support member is limited in movement in a closing direction, for limiting the pivotal movement of said valve member relative to said support means in an opening direction at a point intermediate said full closed and full open position under predetermined flow conditions in said passage, said valve being characterized by a compound movement of said valve member and said support means about the pivotal connection between said support means and said body member when said predetermined flow conditions are exceeded.

3. A valve in accordance with claim 2, in which said support means includes an arm member, wherein said pivotal mounting of said support means is at one end of said arm member, and in which said arm member is pivotally mounted, at its other end, to the means carried by the valve member.

4. A valve in accordance with claim 2, and further comprising stop means operable between said support means and a portion of said body above said pivotal mounting of said support means on said body for limiting the movement of said valve member and said support means in an opening direction.

5. A valve in accordance with claim 2, and further comprising additional stop means operable between said support member and said means carried by said valve member, to limit the movement of said valve member with respect to said support member to the relative position between said valve member and said support member when said valve member is in said full closed position.

6. A valve comprising a body member having a flow passage therethrough, a valve seat formed in a wall of said passage in axial alignment therewith, a movable valve member cooperable with said seat to close said passage, an arm member having one end pivoted to said body member and the opposite end pivoted in said valve member, said valve member being movable between a full closed position in which it engages said valve seat and a full open position in which it is above and substantially parallel to said passage, said valve member being movable in response to flow conditions in said flow passage, means operable between said arm member and said body member for limiting the movement of said arm member in a closing direction, and means including a projection on said arm member for operative engagement with said valve member when said arm member is limited in movement in a closing direction, for positioning the same in a predetermined angular relation to said seat under predetermined flow conditions, said valve being characterized by a compound movement of said valve member and said arm member about the pivotal connection between the arm member and the body member when said predetermined angular relation is exceeded and by a movement of said valve member relative to said arm member toward said seat when said angular relation is decreased below said predetermined value.

7. A valve in accordance with claim 6, and further comprising additional stop means operable between said arm member and said valve member, to limit the movement of said valve member with respect to said arm member to the relative position between said valve member and said arm member when said valve member is in said full closed position.

8. A valve in accordance with claim 6 in which said means operable between said arm member and said body member includes stop means operable between said arm member and a portion of said body below said pivotal mounting of said arm member on said body for limiting the movement of said arm member in a closing direction.

References Cited in the file of this patent

UNITED STATES PATENTS

| | | |
|---|---|---|
| 362,651 | Neary | May 10, 1887 |
| 1,057,435 | Renaud | Apr. 1, 1913 |
| 1,123,813 | Smith | Jan. 5, 1915 |
| 1,670,519 | Pekrul | May 22, 1928 |
| 1,837,658 | Force et al. | Dec. 22, 1931 |

FOREIGN PATENTS

| | | |
|---|---|---|
| 15,927 | Great Britain | Dec. 28, 1885 |
| 473,489 | Great Britain | Oct. 14, 1937 |